(12) United States Patent
Boyd (10) Patent No.: US 7,892,380 B2
(45) Date of Patent: Feb. 22, 2011

(54) APPARATUS AND METHOD FOR MAKING LARGE DIAMETER WOUND-FIBER REINFORCED TANKS

(76) Inventor: John W. Boyd, 4424 Carolina Hwy., Denmark, SC (US) 29042

(*) Notice: Subject to any disclaimer, the term of this patent is extended or adjusted under 35 U.S.C. 154(b) by 0 days.

(21) Appl. No.: 12/321,549

(22) Filed: Jan. 22, 2009

(65) Prior Publication Data

US 2009/0134158 A1  May 28, 2009

Related U.S. Application Data

(62) Division of application No. 11/323,215, filed on Dec. 30, 2005, now Pat. No. 7,481,899.

(51) Int. Cl.
*B29C 70/34* (2006.01)

(52) U.S. Cl. .................. 156/191; 156/184; 156/175; 156/172; 156/425

(58) Field of Classification Search ............ 156/69, 156/191, 175, 172, 425, 184; 29/446; 220/265, 220/267
See application file for complete search history.

(56) References Cited

U.S. PATENT DOCUMENTS

| | | | | |
|---|---|---|---|---|
| 2,808,097 A | * | 10/1957 | Martin | 156/175 |
| 3,377,757 A | * | 4/1968 | Magers, Jr. | 52/223.3 |
| 3,477,652 A | * | 11/1969 | Crowley | 242/438.1 |
| 3,524,780 A | * | 8/1970 | Clements | 156/191 |
| 3,562,047 A | * | 2/1971 | Carlini | 156/184 |
| 3,616,070 A | * | 10/1971 | Lemelson | 156/446 |
| 3,652,366 A | * | 3/1972 | Carlini | 156/443 |
| 3,819,450 A | * | 6/1974 | Kunz | 156/425 |
| 3,843,429 A | * | 10/1974 | Jessup | 156/69 |
| 3,914,151 A | * | 10/1975 | Poulsen | 156/425 |
| 3,966,533 A | * | 6/1976 | Goldsworthy et al. | 156/379.8 |
| 3,975,816 A | * | 8/1976 | Carter | 29/446 |
| 4,222,804 A | * | 9/1980 | Short | 156/182 |
| 4,288,277 A | * | 9/1981 | Siilats | 156/425 |
| 4,448,628 A | * | 5/1984 | Stott | 156/425 |
| 4,557,422 A | * | 12/1985 | Gill et al. | 242/443 |
| 5,194,110 A | * | 3/1993 | Fawley | 156/94 |
| 5,335,167 A | | 8/1994 | Boyd | |
| 6,782,932 B1 | | 8/2004 | Reynolds, Jr. et al. | |

* cited by examiner

*Primary Examiner*—Anthony Stashick
*Assistant Examiner*—Christopher B McKinley
(74) *Attorney, Agent, or Firm*—Bennett Mullinax, LLC (57) ABSTRACT

A process of constructing a large diameter tank is provided. The process includes the step of providing a tank wall mandrel that has at least one drive wheel and at least one curved panel. Glass fibers are applied from a vertical winder to the curved panel in order to form a segment of a tank wall shell. Additional glass fibers are also applied to the curved panel at a location above the segment of the tank wall shell in order to form a unitary tank shell.

4 Claims, 14 Drawing Sheets

APPARATUS AND METHOD FOR MAKING LARGE DIAMETER WOUND-FIBER REINFORCED TANKS

FIELD OF THE INVENTION

This invention relates generally to the field of wound-fiber processes. More specifically, the invention is related to a method and apparatus for winding fibers and applying resins to make large diameter, wound-fiber reinforced tanks.

BACKGROUND

Wound-fiber reinforced tanks are well known in the art. Such tanks are typically made by winding glass, graphite, or other reinforcing fibers about a tank mandrel, a wire, or other tank form. The fibers are wound in substantially helical, hoop, multi-axis, combination and/or orthowinding patterns and may be impregnated with resins during or subsequent to the winding steps. The resin is cured to create the finished product.

Heretofore, large diameter wound-fiber tanks could be manufactured and shipped in an oblated condition and then assembled on site by having a reinforced bottom and top supplied to the cylindrical side walls. For larger diameter tanks, it is known to construct tanks on site which involves applying the wound fibers to a tank mandrel at the location of the finished tank in either a vertical or horizontal direction. As one circumferential segment of the cylindrical tank wall is built and cured, the cured tank wall is extracted from the mandrel and elevated a sufficient distance while an additional cylindrical segment of the tank wall is applied and connected thereto to the raised upper section. For certain diameter tanks, these steps can be reproduced several times until a desired tank height is reached.

One limitation of the above process is that as either a tank diameter, a tank height or a tank weight exceeds a certain threshold, it is no longer practical to elevate the previously wound tank wall(s) so as to add an additional lower tank wall segment. The size and weight of the prior assembled tank wall segments are such that the engineering difficulties and safety concerns make it impractical to construct tanks in such a manner having a diameter greater than about 60 feet or a height greater than about 30 feet. Nonetheless, there remains a need in the industry for large diameter wound-filament tanks.

Accordingly, there remains room for variation and improvement within the art.

SUMMARY

Various features and advantages of the invention will be set forth in part in the following description, or may be obvious from the description, or may be learned from practice of the invention.

It is at least one aspect of one embodiment of the present invention to provide for a process of constructing large diameter tanks in which a first segment of a tank cylindrical wall is constructed on a mandrel. Following construction and curing of the first cylindrical tank wall segment, the mandrel mold walls are detached from the cured tank wall segment and the mandrel is raised to a second position above the height of the first tank segment. The raised mandrel may then be used to form a second cylindrical wall segment which is integrally joined to an overlapping portion of the lower tank wall segment. By repeating the above steps, a tank of virtually any desired diameter may be constructed to a desired height. Since the mandrel is being raised as opposed to the tank walls, the weight and safety limitations associated with elevating a tank wall is avoided.

It is yet a further aspect of at least one embodiment of the present invention to provide for a mandrel for constructing large diameter tanks, namely tanks having either a diameter greater than about 60 feet or a height greater than about 30 feet. The mandrel includes a center pivot with a series of radial trusses and interconnecting supports extending therefrom. The supports are used to position a plurality of mandrel wall panels having a curvature such that the plurality of interlocking panels form an integral wall template upon which wound fibers may be applied. The assembled mandrel may be rotated by a series of drive wheels which support the circumferential edge of the mandrel, the drive wheels positioned on an appropriate track. The drive wheels have a hydraulic drive mechanism, or other mechanism such as an electric drive, to rotate the mandrel at a speed sufficient for application of fibers by an adjacent vertical winding machine.

It is yet a further aspect of at least one embodiment of the present invention to provide for a process of constructing a large diameter tank comprising providing a tank wall mandrel; supporting a circumference of the mandrel with a plurality of drive wheels and support wheels; positioning a plurality of curved panels along an exterior of the mandrel; rotating the mandrel and the curved panels by use of the drive wheels; positioning a vertical winder, such as a vertical tower and material carriage winder, adjacent the rotary mandrel; applying glass fibers from the vertical carriage winder to the surface of the curved panels, thereby constructing a segment of a tank wall shell; detaching the curved panels from the interior surface of the tank wall shell; positioning the curved panels above the previously formed tank wall shell; rotating the mandrel and the previously formed tank shell; applying additional glass fibers to the rotating curved panels and to an upper portion of the tank wall skin, thereby forming a unitary tank shell; and, repeating the last four steps until a desired tank shell height is obtained.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. In which.

Repeat use of reference characters in the present specification and drawings is intended to represent the same or analogous features or elements of the invention.

DETAILED DESCRIPTION OF REPRESENTATIVE EMBODIMENTS

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

As used herein, the term "tank" is defined as a tank, cylinder, vessel, conduit, or other structure that has generally curved walls and that may or may not be closed on either one or both ends. A large diameter tank generally refers to fiber reinforced tanks, such as fiberglass tanks, that have larger diameters and/or heights. Large diameter tanks may also include oblated tanks. Depending upon size and/or volume, large diameter tanks may not be safely constructed by conventional techniques of elevating a segment of the previously wound tank wall so that an additional wall segment may be formed on the fixed mandrel positioned below the raised tank wall.

As seen in reference to FIGS. 1A through 1I, an apparatus is provided which allows the construction of large diameter tanks using a process which raises the mandrel at various stages of the tank construction process as opposed to the tank shell. In this manner, the engineering difficulties and safety issues associated with elevating and maintaining a large tank wall are avoided.

Figure 1A:
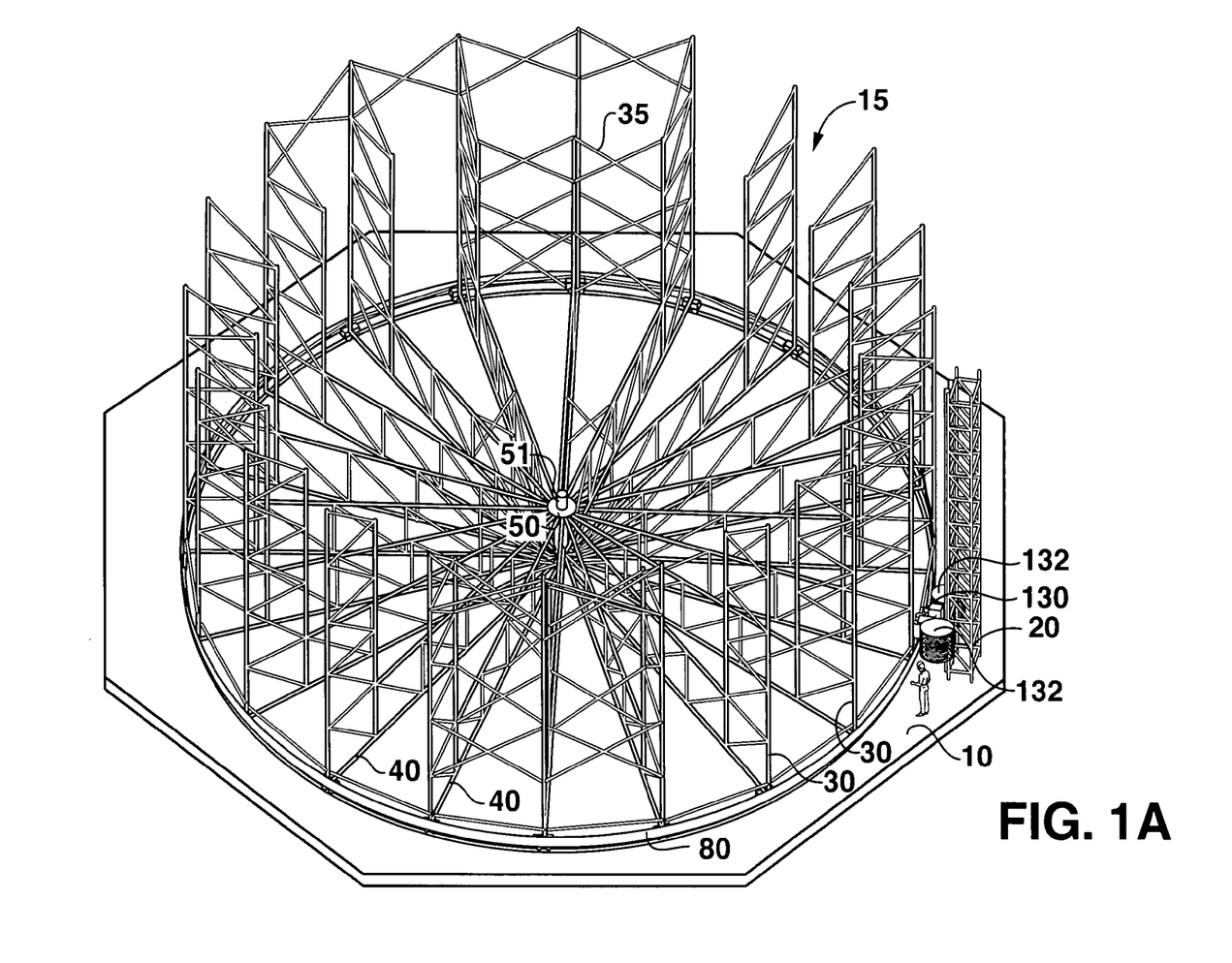
FIG. 1A is a perspective view of a large diameter tank mandrel adjacent a vertical winding station prior to the installation of the mandrel wall panels.
Figure 1B:
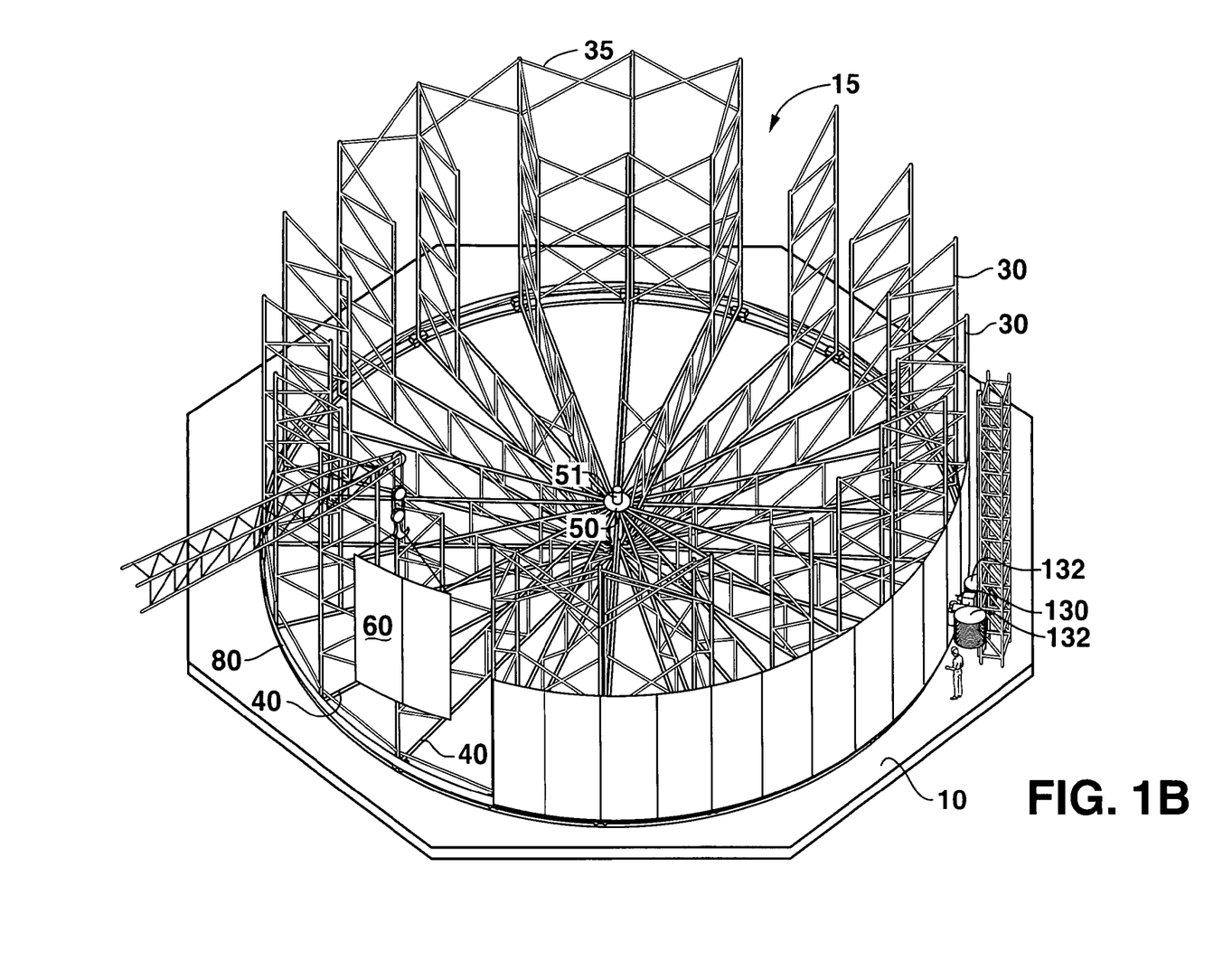
FIG. 1B and FIG. 1C are similar to FIG. 1A showing the wall panels being installed along a lower circumference of the mandrel.

As seen in reference to FIGS. 1A and 1B, an illustration of a portion of a mandrel 15 is set forth which may be used to construct a large diameter tank. A permanent pad 10 such as a concrete footing may be provided and which supports the components of the mandrel 15. At the center of the mandrel 15 is a spindle 50 which is adapted for rotation along a spindle hub 51. Rotatably connected to spindle 50 are a plurality of horizontal struts 40 which extend radially from spindle 50. The free ends of the struts 40 support a number of vertical trusses 30 that are used to support mandrel skin walls 60. While not shown to their full extent, for purposes of clarity of illustration, a variety of interconnected braces 35 may be used to interconnect the horizontal struts 40 to vertical trusses 30 as well as providing interconnections between adjacent vertical trusses 30 and adjacent horizontal struts 40.

Figures 5A, 5B, 5C:
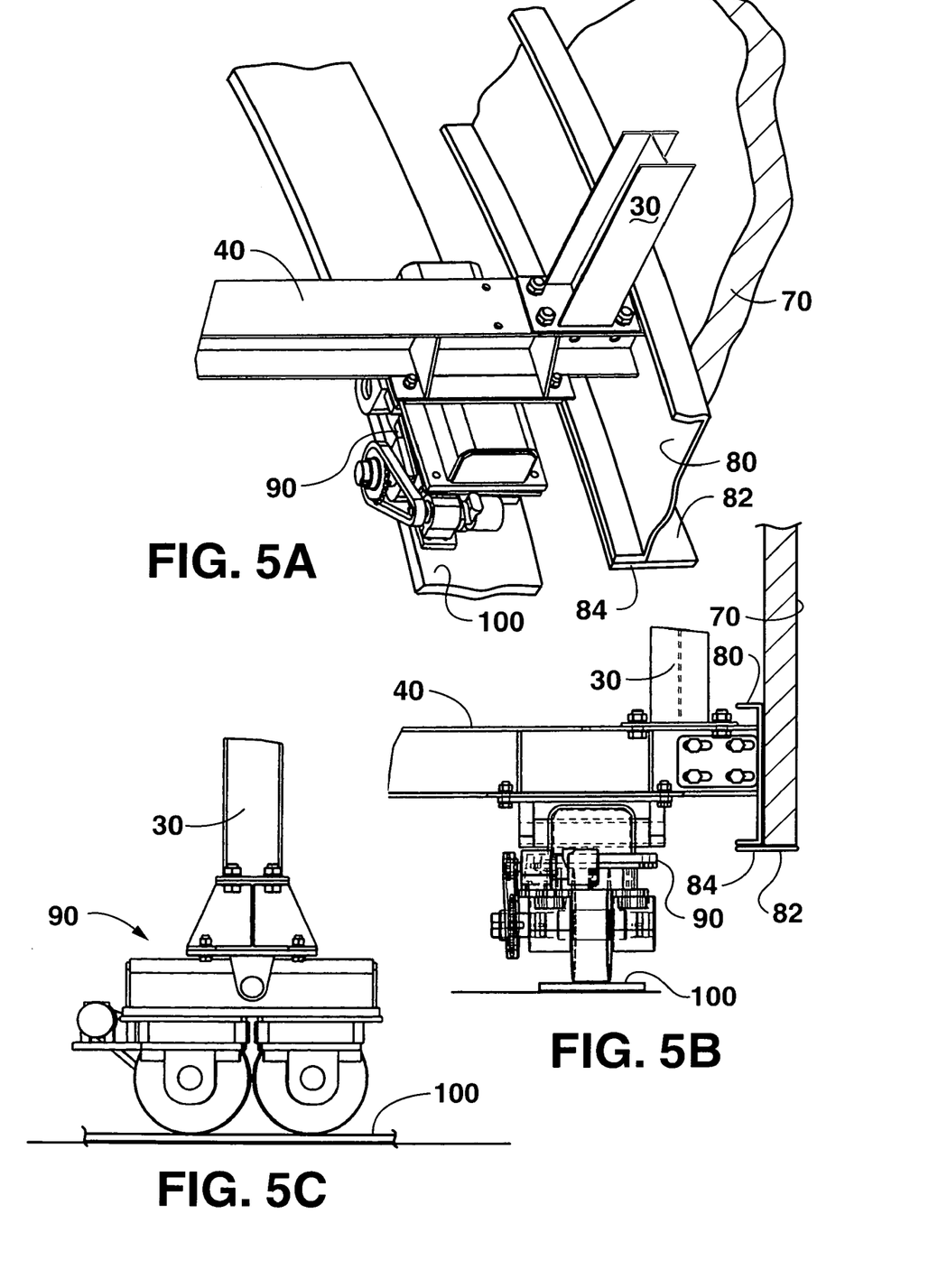
FIGS. 5A to 5C show details of construction and location of the drive wheel relative to the mandrel and closed panel locations.

A circular outer ring 80 is connected to the horizontal struts 40 and defines an outer ledge 82 and an inner ledge 84 as best seen in reference to FIGS. 5A and 5B. Outer ledge 82 supports the shell made of the wound fiberglass 70. In further reference to FIG. 5A and FIG. 5B, the lower portion of selected strut 40 has secured thereto a drive wheel unit 90 which is coupled to the horizontal strut 40. The drive wheel unit 90 is a hydraulically controlled drive mechanism that is interconnected to other drive mechanisms which are spaced at various strut 40 locations around the perimeter of the mandrel 15. In addition to the hydraulically driven drive wheel unit 90, there can also be a number of non-drive support wheels which lack an active drive mechanism but will support the necessary weight and facilitate movement of the mandrel. A circular track 100 extends in a path around an inner perimeter of the mandrel 15. The track 100 provides a suitable surface for the engagement of the drive wheel unit 90 with a twin-wheeled hydraulic drive system as indicated in FIGS. 5A through 5C and is suitable for the requirements of the mandrel 15. It is readily appreciated that a number of suitable drive mechanisms may be used to bring about the circular movement of the assembled mandrel 15.

Figure 1C:
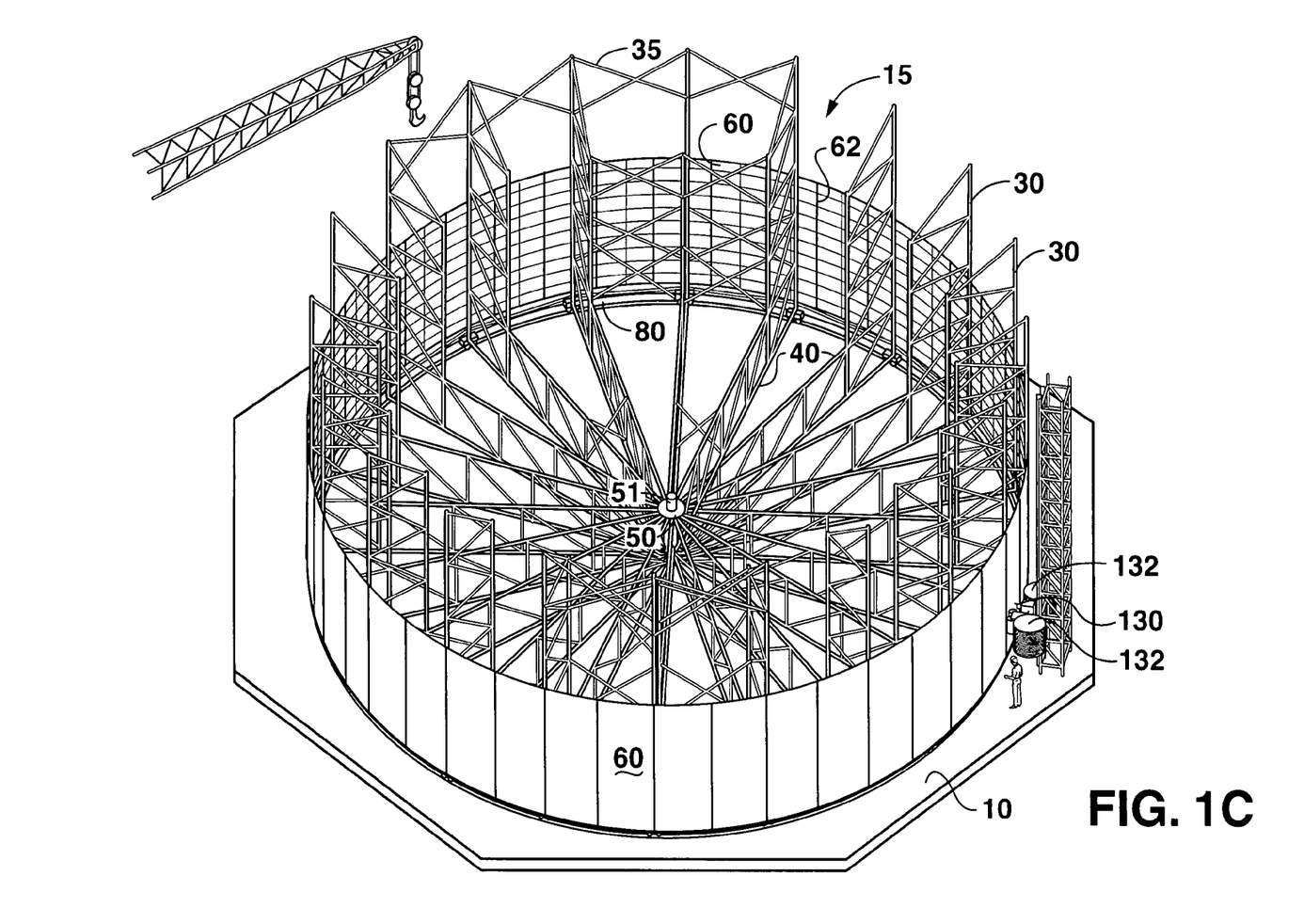
Figures 6, 7:
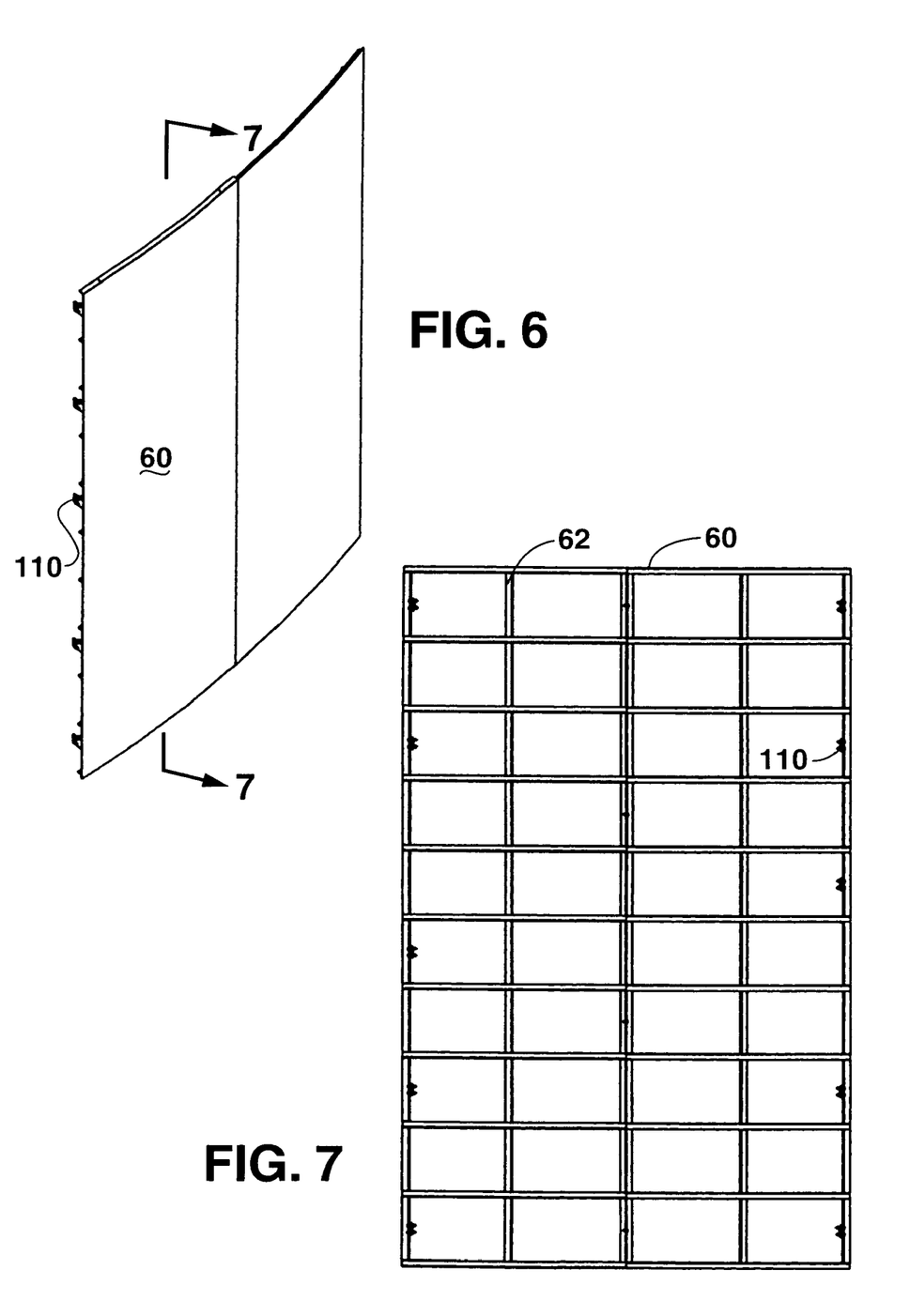
FIG. 6 is a perspective view of a front surface of the curved, interlocking panels.
FIG. 7 is a view as seen in the direction of line 7-7 in FIG. 6 of a rear surface of the panel showing a rear surface of the panel walls along with tabs positioned along either side of the panel for attachment to adjacent panels.

The strut 40 and truss 30 provide an attachment location for mandrel skin panels 60 that are placed around the outer edge of the mandrel 15 as seen in FIGS. 1B and 1C. Respective skin panels 60 as seen in FIG. 6 have clips 110 which may be used to interengage adjacent panels 60 in a tight configuration. Each panel 60 has an exterior surface having a predetermined curvature such that a known quantity of panels 60 will complete formation of a continuous "skin" of panels 60 around an exterior of the mandrel 15, thus providing a uniform circumference for molding a tank.

The inner surface of each panel 60, as best seen in FIG. 7, includes a series of stiffener angles 62 that act to provide stiffness to the resulting panel 60. As is known in the art, mandrel skin panels 60 may be relatively stiff objects in order to facilitate application of the wound fiberglass 70 thereto for formation of the circular tank 100.

Once the panels 60 are installed, the mandrel 15 has a continuous skin layer of panels 60 along the lower circumferential edge of the mandrel 15. Adjacent to mandrel skin panels 60 is a vertical winding machine 130 which, in the embodiment presently illustrated, has two separate fiberglass creels 132 for dispensing multiple strands of fibers. Any type of commercially available winder may be employed. For example, commercially available filament winders that may be used include Magnum Venus Products, Multiplex 1000, multi-axis filament winder, as well as similar products marketed by Magnum Venus Products (Kent, Washington and Clearwater, Fla.). Such systems have the ability to wind multiple axis at one time and include control systems which may respond to controllable speeds of rotation. As known in the art, a vertical winding machine 130 may have a speed sensor responsive to the actual speed or motion of the mandrel 15 and may be programmed to apply fibers in pre-determined patterns such as substantially helical, hoop, multi-axis, combination and/or orthowinding patterns. Suitable control systems for mandrels 15 are well known in the art as represented by assignee's prior U.S. Pat. No. 5,335,167, directed to a filament winding apparatus, and U.S. Pat. No. 6,782,932, assigned to Hydril Company, L.P., the disclosures of which are incorporated herein by reference in their entirety for all purposes.

Figure 1D:
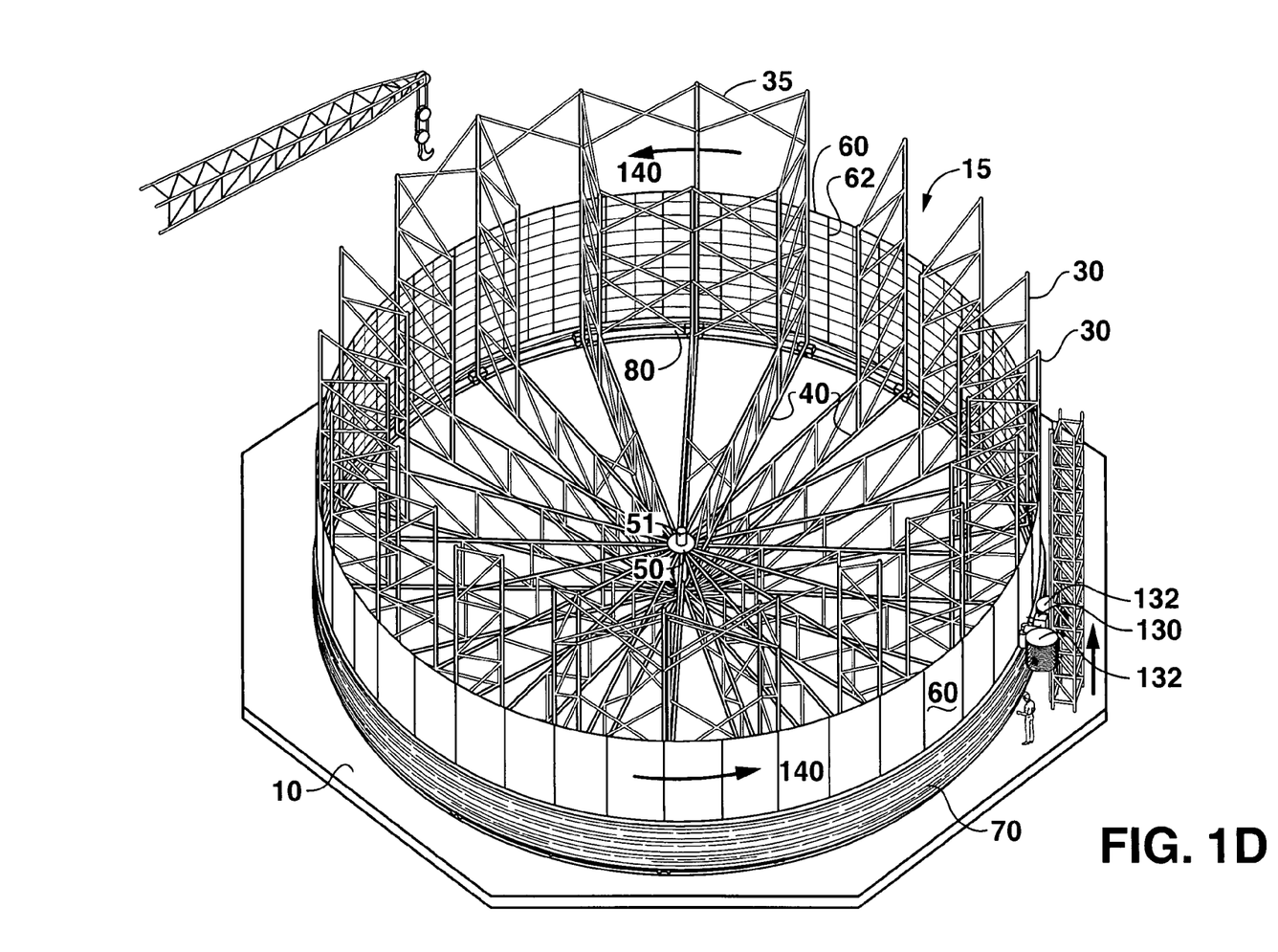
FIG. 1D illustrates the rotation of the mandrel and illustrating the fiber as applied by the vertical winder. Although counterclockwise rotation is shown, clockwise rotation may be used alternatively or in addition to counterclockwise rotation in other exemplary embodiments.
Figure 1E:
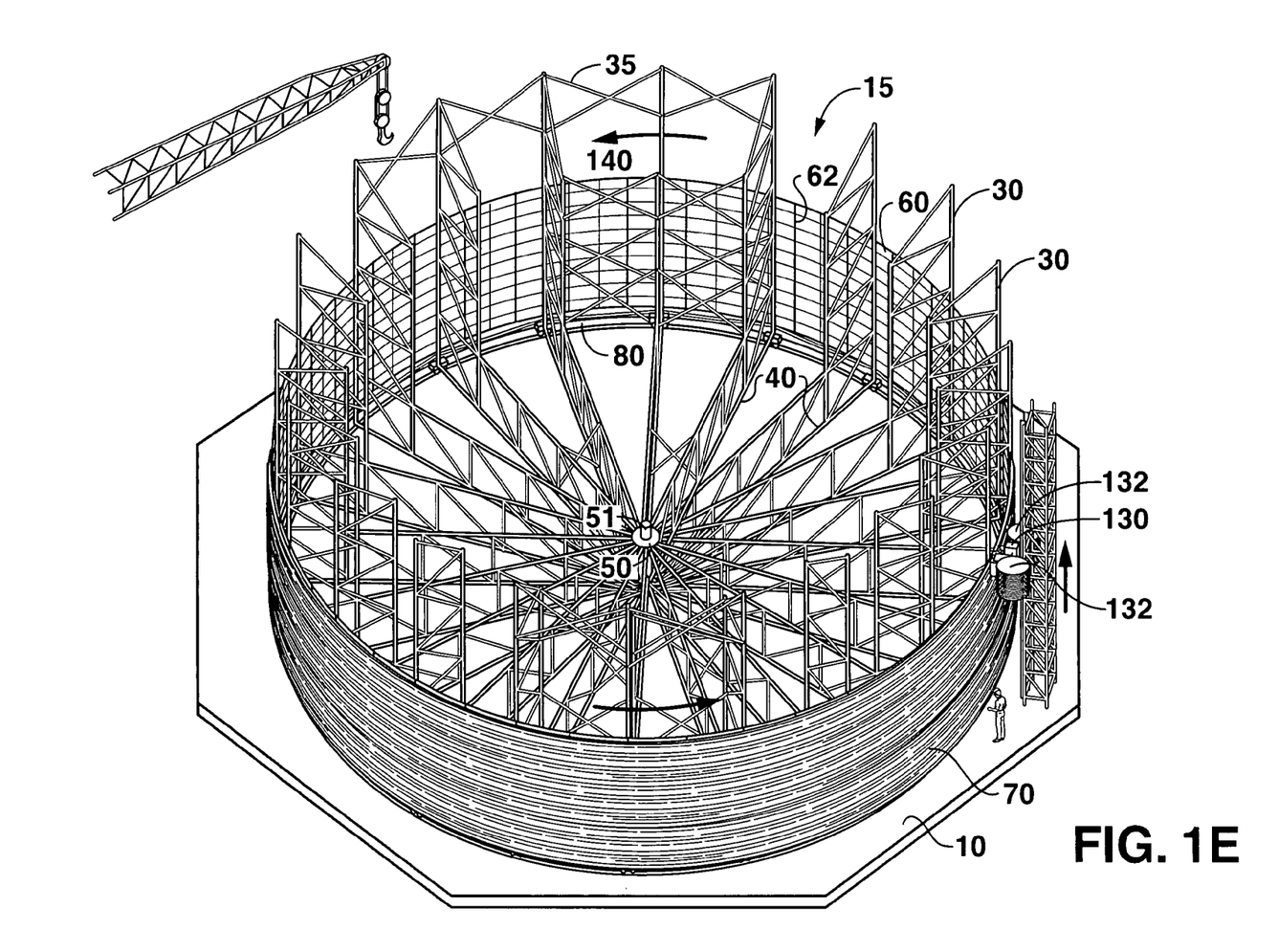
FIG. 1E illustrates the application of the fibers along the uppermost edge of the mandrel circumferential edge walls.

As seen in reference to FIG. 1D, the drive wheel 90 provides for controlled rotation of the mandrel 15 as seen by the directional arrows 140. As the mandrel 15 rotates, the vertical winding apparatus 130 moves in a vertical direction as the application of fibers proceeds. As seen in a comparison of FIG. 1D to FIG. 1E, the wound fiberglass 70 is initially laid at the bottom of the mandrel skin walls 60 and is applied as a series of sequentially overlapping layers of reinforcement. Once the appropriate thickness is achieved, the vertical winder 130 adjusts in height accordingly to continue with a smooth transition of applied fiberglass extending from the bottom of the mandrel skin wall 60 to the uppermost edge thereof.

Figure 1F:
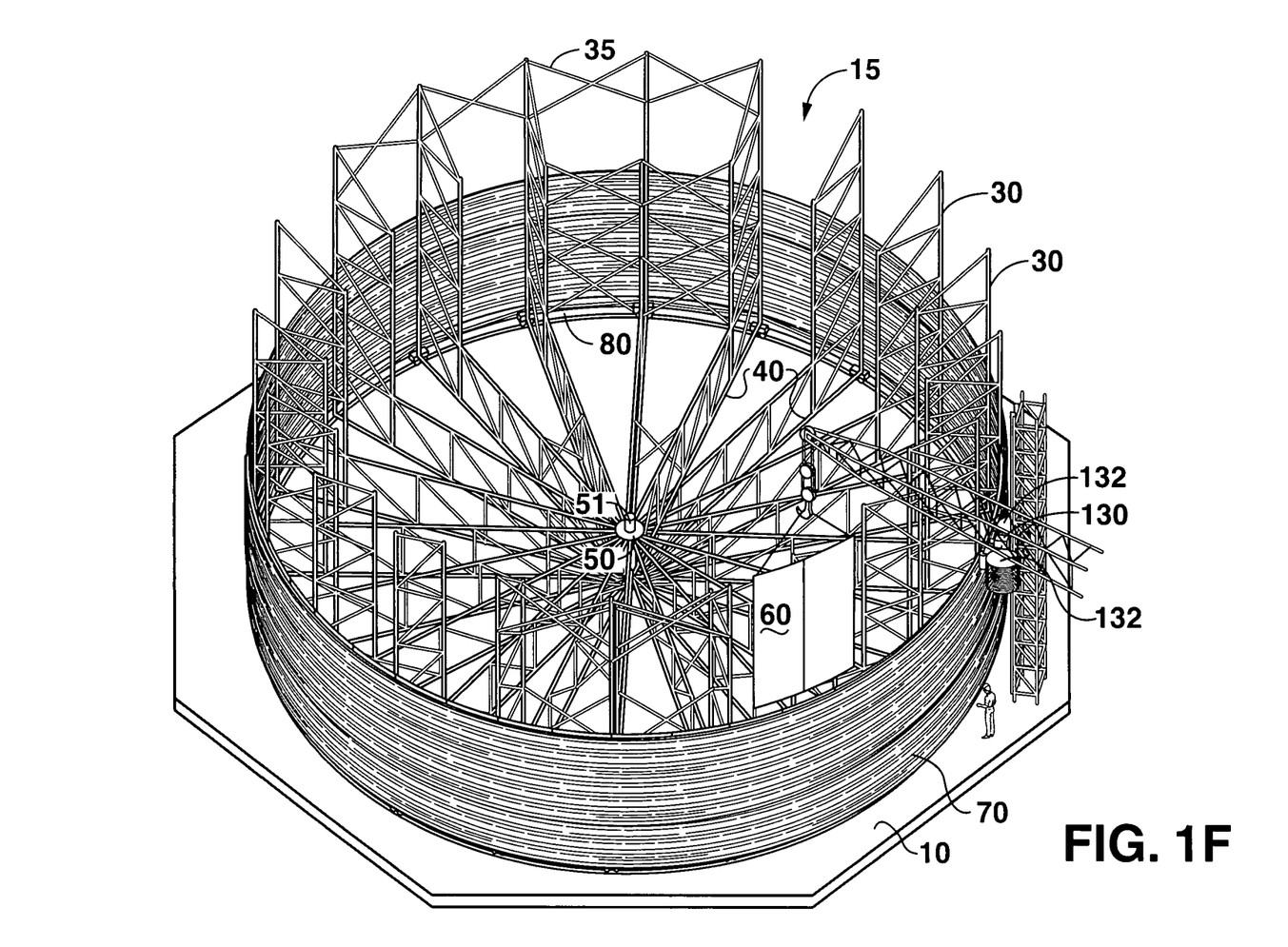
FIG. 1F illustrates the removal and repositioning of a segment of the mandrel edge walls to a position opposite an upper edge wall of the first wound tank wall segment.
Figure 1G:
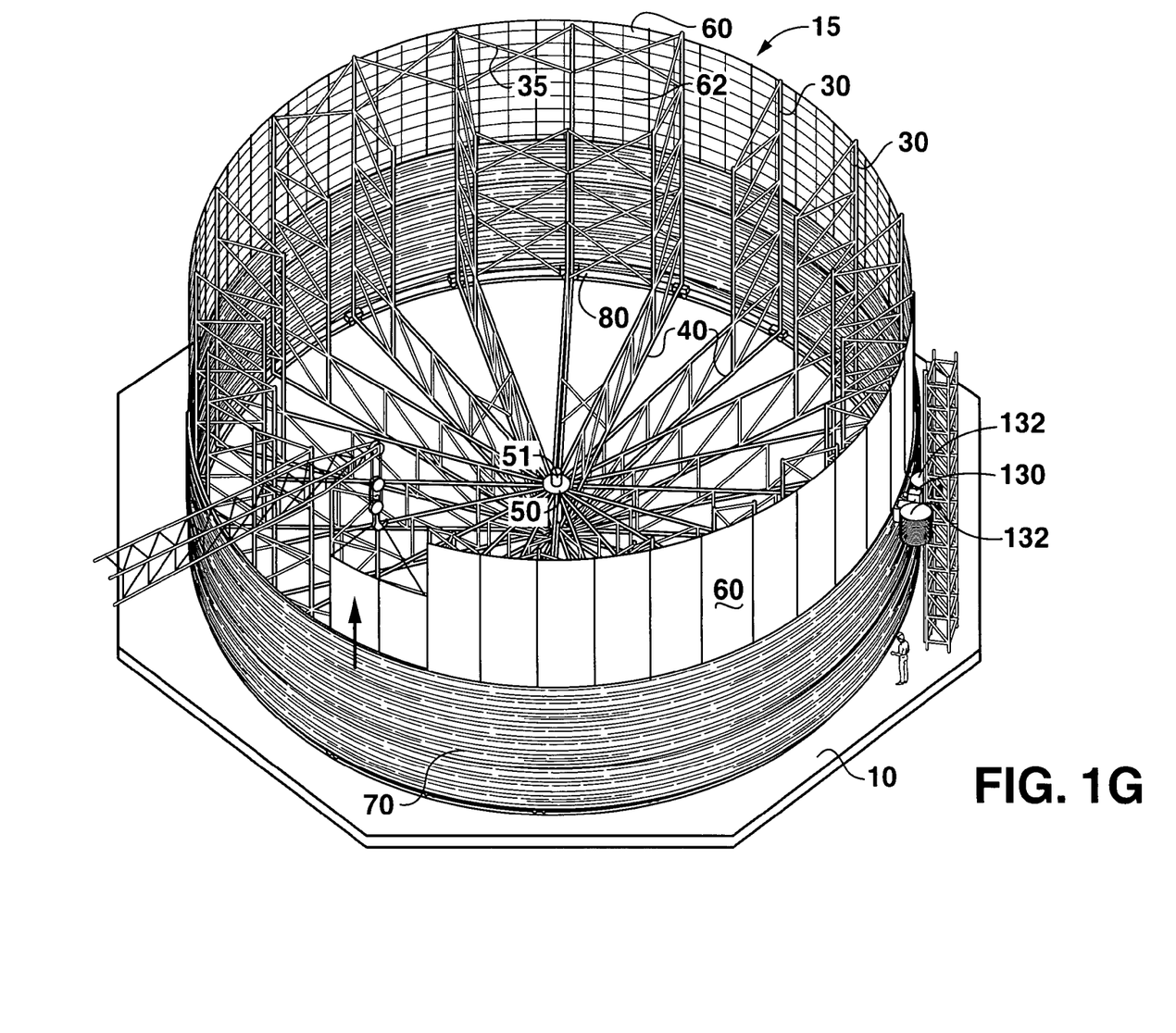
FIGS. 1G and 1H illustrate additional details of placement of the mandrel edge walls positioned above and substantially co-planar with the previous wound segment of the tank wall.
Figure 1H:
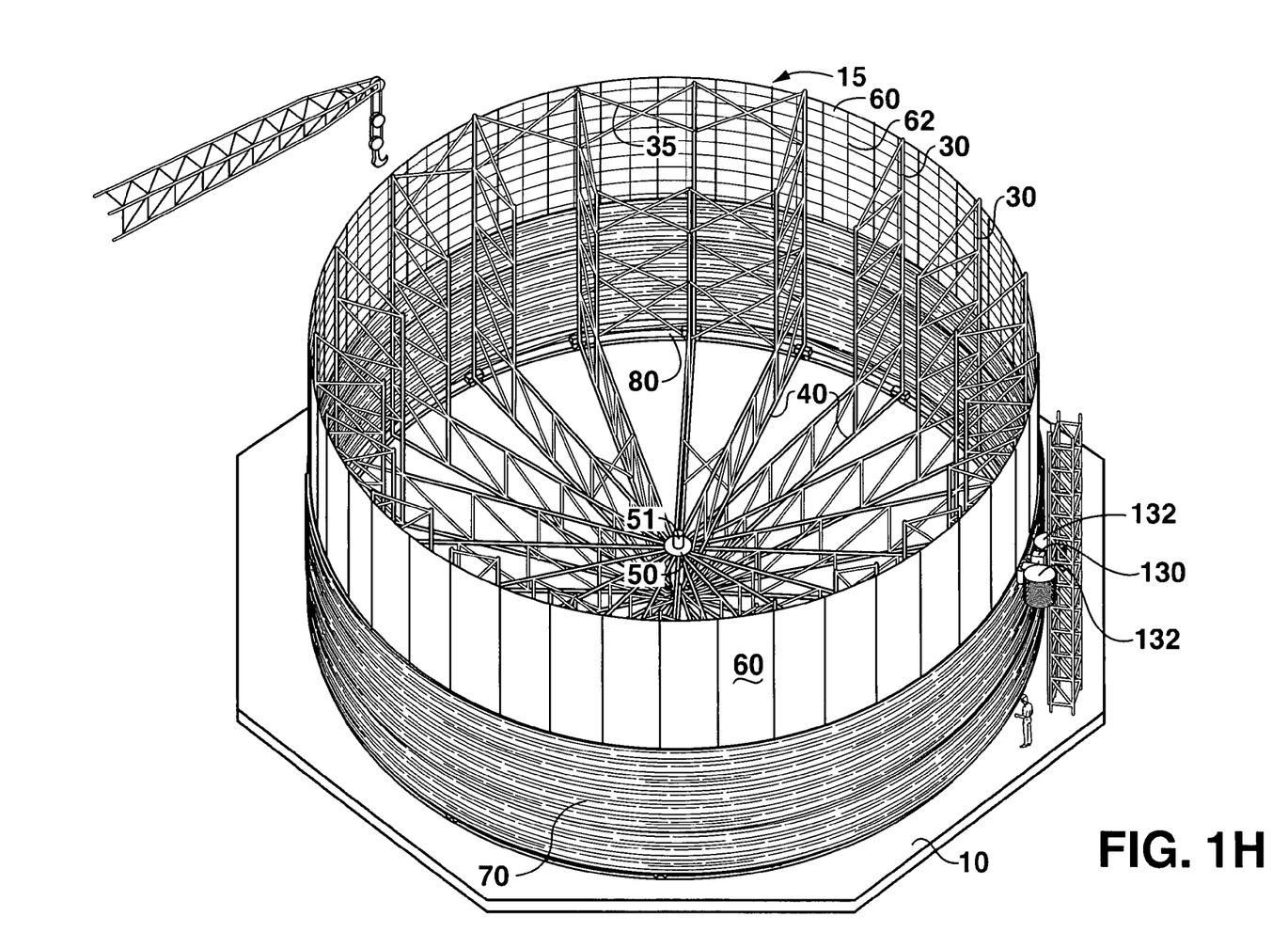

As seen in reference to FIG. 1F, following curing of the first wall segment of fiberglass 70, the panels 60 are individually released and removed from the first winding position and are reinstalled against the vertical truss 30 such that panels 60 now extend above the upper edge of the first segment of wound fiberglass 70. Following installation of panels 60 as seen in FIGS. 1G and 1H, additional segments of wound fiberglass 70 are applied against the skin walls 60 and are interconnected to the previously wound segments of the cylindrical fiberglass wall 70. The merging of adjacent layers of fiberglass walls 70 so as to form a single integral wall is recognized as an ability of one having ordinary skill in the art.

Figure 1I:
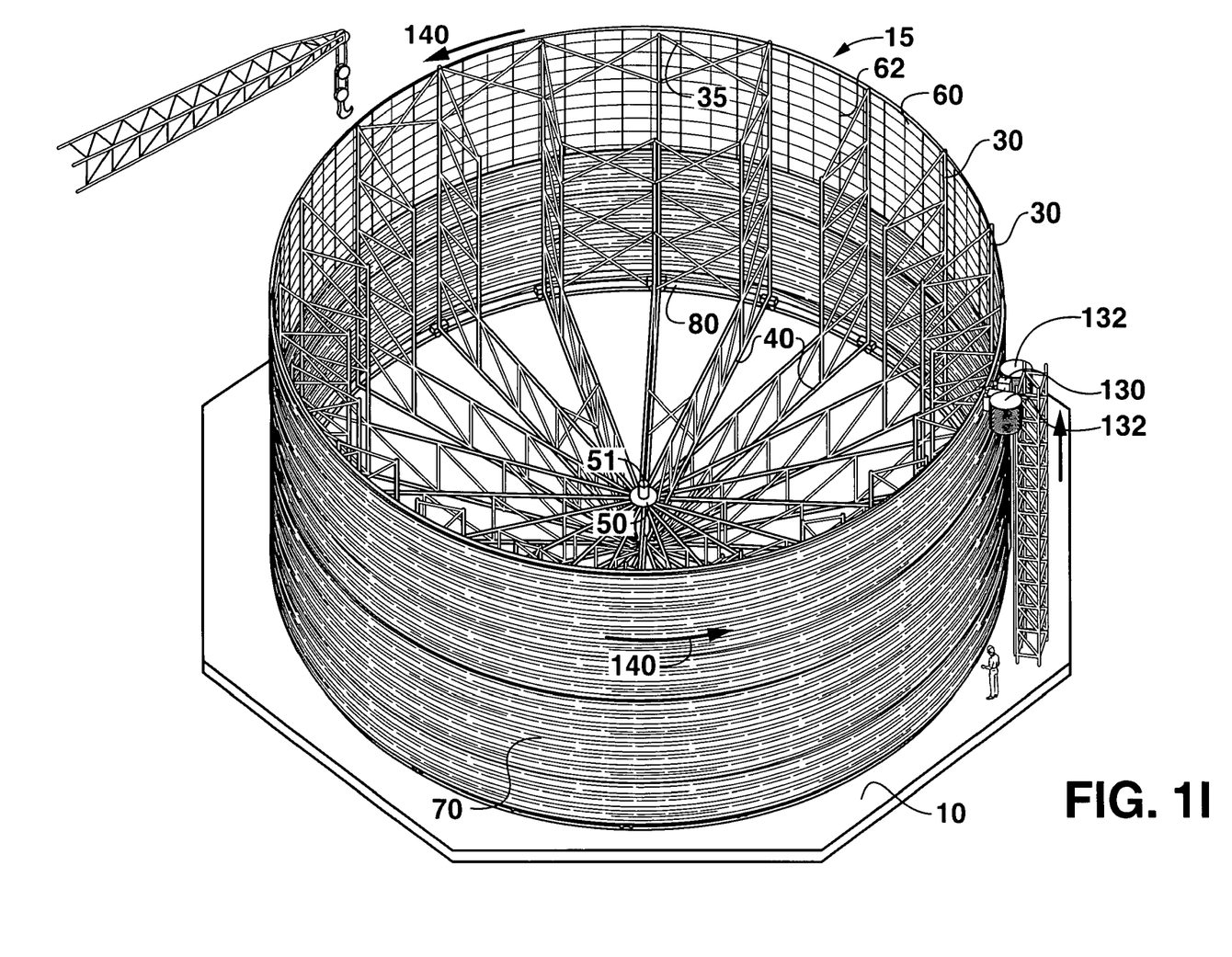
FIG. 1I illustrates application of wound filaments to the elevated portions of the mandrel thereby forming a continuous height first wound wall segment attached to an upper second wound wall segment.
Figure 2:
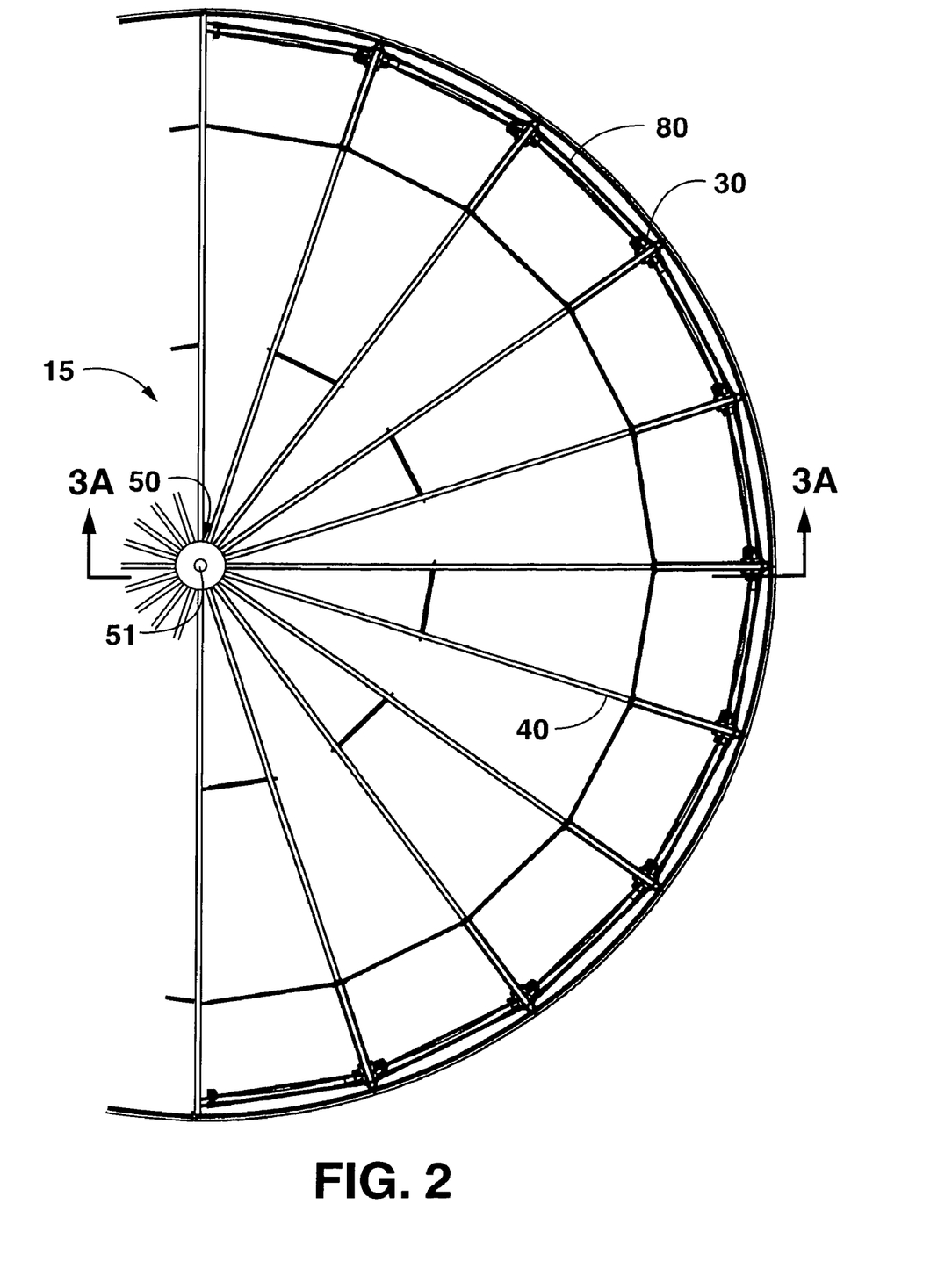
FIG. 2 illustrates a schematic detail of the mandrel structure showing the radiating support walls which provide a framework for the wall segments.
Figures 3A, 3B:
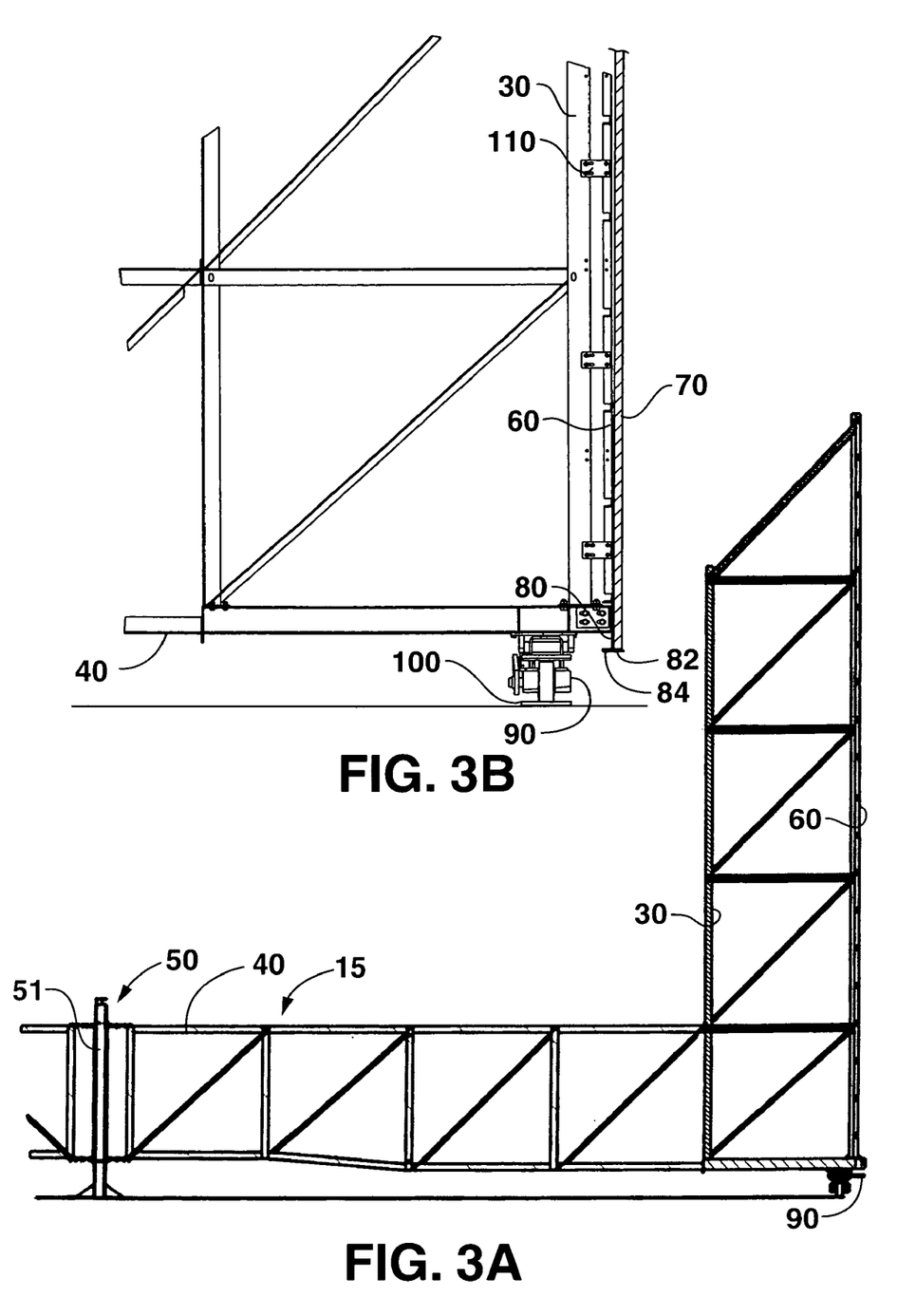
FIG. 3A is an elevational view of one of the radiating trusses and vertical supports showing central rotating spindles in an outer edge of the mandrel being supported on a drive wheel.
FIG. 3B is an enlargement of the outermost segments of a mandrel showing the drive wheel and attachment plates for holding the curved panels supporting the trusses.
Figure 4:
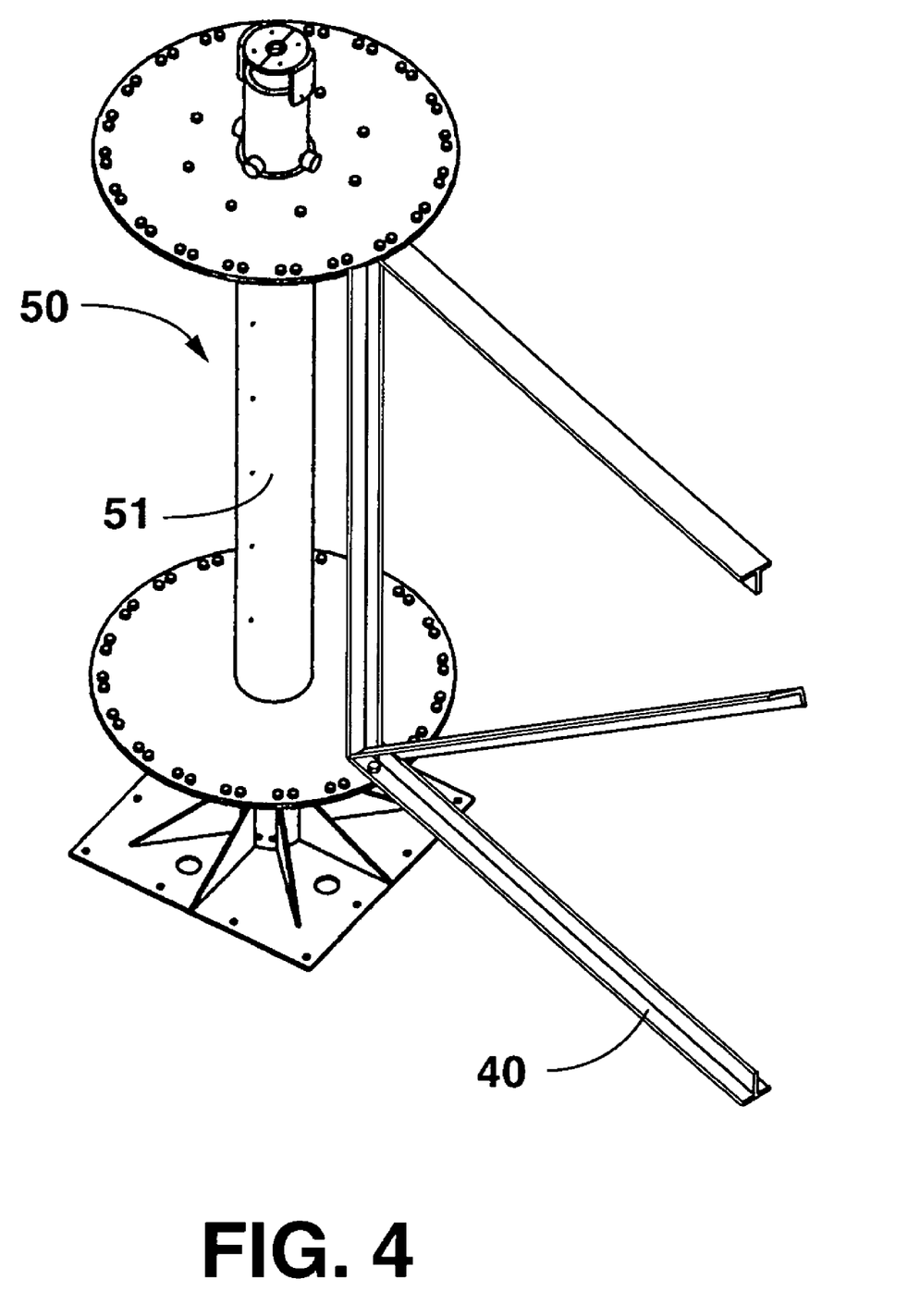
FIG. 4 illustrates the central spindle which facilitates rotation of the mandrel.

In reference to FIG. 1I, the mandrel skin panels 60 may be raised to yet a third height allowing for a repeating application of an additional height segment to the cylindrical tank wall. The number of repeating steps of detaching, raising, and re-attaching the mandrel skin wall panels 60 is determined by a number of factors including the height of the panel 60 as well as the design height of the finished tank wall. When the tank walls are completed, the internal mandrel 15 supports including the vertical trusses 30 and the horizontal struts 40 may be removed. Prior to removal, the use of hydraulic jacks or other mechanisms may be needed to support the mandrel 15 while the drive wheels are removed. Thereafter, the mandrel 15 may be lowered until the ring 80 with lower edges 82 and 84 is close to the surface of pad 10. At that point, the scaffolding components may be removed and the wound fiberglass entity in the form of a cylindrical tank wall is self supporting. The mandrel 15 elements are removed through the open top of the fiberglass tank wall following which time a tank bottom is installed as is conventional within the art along with the upper tank closure. In this manner, a large diameter tank is provided in which the tank walls are formed in the strongest fashion possible and in a manner that is not possible with conventional construction techniques of elevating tank walls above a mandrel 15 station.

An appreciation of the capabilities of the present disclosure is best exemplified in a comparison of the qualities of the finished fiberglass tank constructed by the present disclosure in comparison to the upper range of tank sizes which may be produced by previous methods. For instance, a mandrel 15 weight requirement for a 119' diameter tank is in excess of 250,000 pounds. The weight of the fiberglass tank wall is in excess of 512,000 pounds. Given the extreme weight of the resulting tank structure, it readily appreciated that the considerations and engineering difficulties preclude the use of prior techniques of elevating partial sections of wound tanks above a mandrel 15 while a lower portion of the tank is wound. The present process enables a much larger diameter tank to be constructed at a height which otherwise could not be achieved. Such tanks have enormous utility in terms of storage vessels, reaction vessels, and other industrial uses, especially in environmental applications that reduce the component causes of acid rain.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A large diameter tank made by a process comprising the steps of:
   providing a tank wall mandrel having at least one drive wheel and a plurality of curved panels, wherein said tank wall mandrel has a plurality of vertical trusses that support said curved panels;
   rotating said mandrel by said drive wheel;
   positioning a vertical winder adjacent said mandrel;
   applying glass fibers from said vertical winder to said curved panels so as to form a segment of a tank wall shell while said curved panels are supported by said vertical trusses, wherein said curved panels onto which said glass fibers are applied have inner surfaces that are engaged by said vertical trusses during rotation of said mandrel and application of said glass fibers from a bottom to an uppermost edge of said curved panels, wherein said tank wall mandrel rotates about an axis and wherein said vertical trusses are located closer to said axis in a radial direction than said curved panels during application of said glass fibers thereto and rotation of said mandrel;
   repositioning said curved panels above said segment of the tank wall shell;
   rotating said mandrel and said segment of the tank wall shell by said drive wheel;
   repositioning said vertical winder; and applying additional glass fibers to said curved panel at a location above said segment of the tank wall shell so as to form a unitary tank shell.

2. The large diameter tank made by the process as set forth in claim 1, further comprising the step of repeating said repositioning steps, said rotating said mandrel and said segment step, and said applying additional glass fibers step until a desired unitary tank shell height is obtained.

3. The large diameter tank made by the process as set forth in claim 1, wherein said unitary tank shell has a diameter of at least sixty feet.

4. The large diameter tank made by the process as set forth in claim 1, wherein said curved panels are positioned on said plurality of vertical trusses.

* * * * *